(12) United States Patent
Scagnelli

(10) Patent No.: US 10,979,603 B2
(45) Date of Patent: Apr. 13, 2021

(54) UNDERWATER PHOTOGRAPHY DEVICES, AND UNDERWATER PHOTOGRAPHY METHODS

(71) Applicant: Steven Scagnelli, Jersey City, NJ (US)

(72) Inventor: Steven Scagnelli, Jersey City, NJ (US)

(*) Notice: Subject to any disclaimer, the term of this patent is extended or adjusted under 35 U.S.C. 154(b) by 110 days.

(21) Appl. No.: 16/521,899

(22) Filed: Jul. 25, 2019

(65) Prior Publication Data

US 2020/0036869 A1   Jan. 30, 2020

Related U.S. Application Data

(60) Provisional application No. 62/703,255, filed on Jul. 25, 2018.

(51) Int. Cl.
*H04N 1/62* (2006.01)
*G06T 7/90* (2017.01)

(52) U.S. Cl.
CPC .............. *H04N 1/626* (2013.01); *G06T 7/90* (2017.01); *G06T 2207/10024* (2013.01)

(58) Field of Classification Search
CPC ........ H04N 1/626; H04N 1/4076; G06T 7/90; G06T 2207/10024
See application file for complete search history.

(56) References Cited

U.S. PATENT DOCUMENTS

| | | |
|---|---|---|
| D401,263 S | 11/1998 | McCabe |
| D403,709 S | 1/1999 | Norwood |
| D468,198 S | 1/2003 | Nakazawa |
| D509,253 S | 9/2005 | Makki |
| D627,820 S | 11/2010 | Oyama |
| D652,750 S | 1/2012 | Halford et al. |
| D678,054 S | 3/2013 | Powers |
| D691,056 S | 10/2013 | Akers, Jr. |
| D691,057 S | 10/2013 | Akers, Jr. |
| D691,058 S | 10/2013 | Akers, Jr. |
| D737,362 S | 8/2015 | Chang |
| D768,770 S | 10/2016 | Lee et al. |
| D807,959 S | 1/2018 | Liddy et al. |
| D826,050 S | 8/2018 | Volker, Jr. |
| D859,141 S | 9/2019 | Baker |

OTHER PUBLICATIONS

Datacolor, SpyderCHECKR 24, User's Guide, downloaded Oct. 9, 2018, from https://www.datacolor.com/photography-design/product-overview/spyder-checkr-family/.

*Primary Examiner* — Christopher Wait
(74) *Attorney, Agent, or Firm* — Studebaker & Brackett PC

(57) ABSTRACT

The inventive plastic card permits a scuba diver to photograph underwater such as at 100 feet, without using external lighting, and to achieve quality photographic images as if external lighting actually had been used during the underwater photography.

18 Claims, 5 Drawing Sheets

UNDERWATER PHOTOGRAPHY DEVICES, AND UNDERWATER PHOTOGRAPHY METHODS

FIELD OF THE INVENTION

The invention relates to underwater photography, especially to underwater photography at depths by a scuba diver.

BACKGROUND OF THE INVENTION

Underwater photography by a scuba diver conventionally, without usage of external lights, has yielded images in which the water around the photographed subject appears as blue, to the point of the subject being essentially undiscernible.

The inventor also is a photographer on land: land photographers know of Datacolor/Spyder Checkr systems useable on land-based photographs to carry out computerized color correction. This is accomplished by the photographer carrying albums of SpyderCHECKR paper-stock colored cards that he photographs along with his subject, along with usage of the proprietary SpyderCHECKR calibration software. The SpyderCHECKR software also tells the photographer when his SpyderCHECKR paper-stock colored cards are fading and hence becoming unuseable and needing to be reordered and replaced.

However, SpyderCHECKR paper-stock colored cards are unuseable underwater; for one thing, being made of a paper product, they would dissolve. Also the configuration of the SpyderCHECKR paper-stock colored cards system would be unwieldy and physically infeasible for a scuba diver at depth engaged in photography. With usage underwater of SpyderCHECKR colored cards being impossible, a photograph that a scuba diver takes underwater cannot make use of SpyderCHECKR calibration software.

Near the water's surface, the lighting provided by sunlight may be substantial and permit a relatively distinct image of the subject. However, at depths, sunlight is insubstantial and only a low quality image of a subject can be expected. Usage of external lighting can improve image quality, but in most contexts transported and using external lighting devices by a scuba diver who is also engaged in photography at depths is infeasible or not wanted. There is an unmet need for technology for underwater photography by a scuba diver, especially at depths, including depths such as 100 ft.

Attempts by others have been made at auto correction of underwater photos, using average color values for water. This results in many images not looking right, as water conditions and time of day can dramatically influence the levels at which different colors are reduced by diffraction of the water.

SUMMARY OF THE INVENTION

The present inventor has determined that if a scuba diving photographer would want to theoretically "delete" the water from his image taken underwater, no conventional system exists to automatically do so. The inventor has solved the problem by inventing a tangible object (most preferably a plastic card) sized and shaped to be transported by a scuba diver underwater such as at 100 feet, to photograph underwater such as at 100 feet, without using external lighting, and to achieve quality photographic images as if external lighting actually had been used during the underwater photography.

The invention in a preferred embodiment provides an underwater photography device, comprising a set of colored sections comprising a first section defined by Panatone color code White 663C; a second section defined by Panatone color code Grey Cool Gray 3 c; a third section defined by Panatone color code Red 1807C; a fourth section defined by Panatone Green 7740 C; a fifth section defined by Panatone Magenta 2061 C; a sixth section defined by Panatone Yellow 611 C; a seventh section defined by Panatone Orange 7555 C and an eighth section defined by Panatone Blue 8782 C; the set of colored sections being disposed on a solid object (such as, e.g., a solid object that is a card having a length of about 3.5 inches, a width of about 2 inches, and a thickness in a range of about 0.01-0.25 inches; a flat solid object; etc.); wherein the solid object is characterized by an exterior consisting of a non-paper material, such as, e.g., inventive underwater photography devices wherein the exterior consists of plastic; inventive underwater photography devices wherein the solid object is a card; inventive underwater photography devices consisting of plastic and colorants; inventive underwater photography devices further comprising a hole in the card, wherein the hole receives a diving clip clipped through the hole; inventive underwater photography devices wherein the cross-sectional surface area of the card is no more than about 7 square inches; etc.

In another preferred embodiment, the invention provides an underwater photography device, comprising a set of sections comprising a section defined by Panatone color code Grey Cool Gray 3 c; a section defined by Panatone color code Red 1807C; a section defined by Panatone Green 7740 C; a section defined by Panatone Magenta 2061 C; a section defined by Panatone Yellow 611 C; a section defined by Panatone Orange 7555 C and a section defined by Panatone Blue 8782 C; the set of colored sections being disposed on a solid object (such as, e.g., a solid object that is a card having a length of about 3.5 inches, a width of about 2 inches, and a thickness in a range of about 0.01-0.25 inches; a flat solid object; etc.); wherein the solid object is characterized by an exterior consisting of a non-paper material, such as, e.g., inventive underwater photography devices wherein the exterior consists of plastic; inventive underwater photography devices wherein the solid object is a card; inventive underwater photography devices consisting of plastic and colorants; inventive underwater photography devices further comprising a hole in the card, wherein the hole receives a diving clip clipped through the hole; inventive underwater photography devices wherein the cross-sectional surface area of the card is no more than about 7 square inches; inventive underwater photography devices further comprising a section defined by Panatone color code White 663C; etc.

The invention in another preferred embodiment provides an underwater photography method, comprising: receiving, into a computer, an image of a card comprising a set of color blocks, the card being characterized by a non-paper exterior, wherein the image of the card was photographed by a scuba diver underwater; receiving, into the computer, an image of a subject, wherein the image of the subject was photographed by the scuba diver underwater at a same depth as the image photographed of the card; and a deletion step of, in the image of the subject, deleting the water, such as, e.g., inventive methods further comprising photographing the card and photographing the subject at a depth of about 100 feet; inventive methods wherein no external lighting was used during underwater photography; inventive methods wherein the card used in the method comprises a set of sections comprising a section defined by Panatone color code Grey Cool Gray 3 c; a section defined by Panatone color code Red 1807C; a section defined by Panatone Green 7740 C; a section defined by Panatone Magenta 2061 C; a section defined by Panatone Yellow 611 C; a section defined by Panatone Orange 7555 C and a section defined by Panatone Blue 8782 C (wherein the card preferably further comprises a section defined by Panatone color code White 663C); the set of colored sections being disposed on a solid object; wherein the solid object is characterized by an exterior consisting of a non-paper material; inventive methods wherein the card used in the method has a length of about 3.5 inches, a width of about 2 inches, and a thickness in a range of about 0.01-0.25 inches; inventive methods further comprising a clipping step of clipping a diving clip through a hole in the card; inventive methods wherein the card used in the method has cross-sectional surface area of no more than about 7 square inches; and other inventive methods.

DETAILED DESCRIPTION OF THE PREFERRED EMBODIMENT

Figure 1:
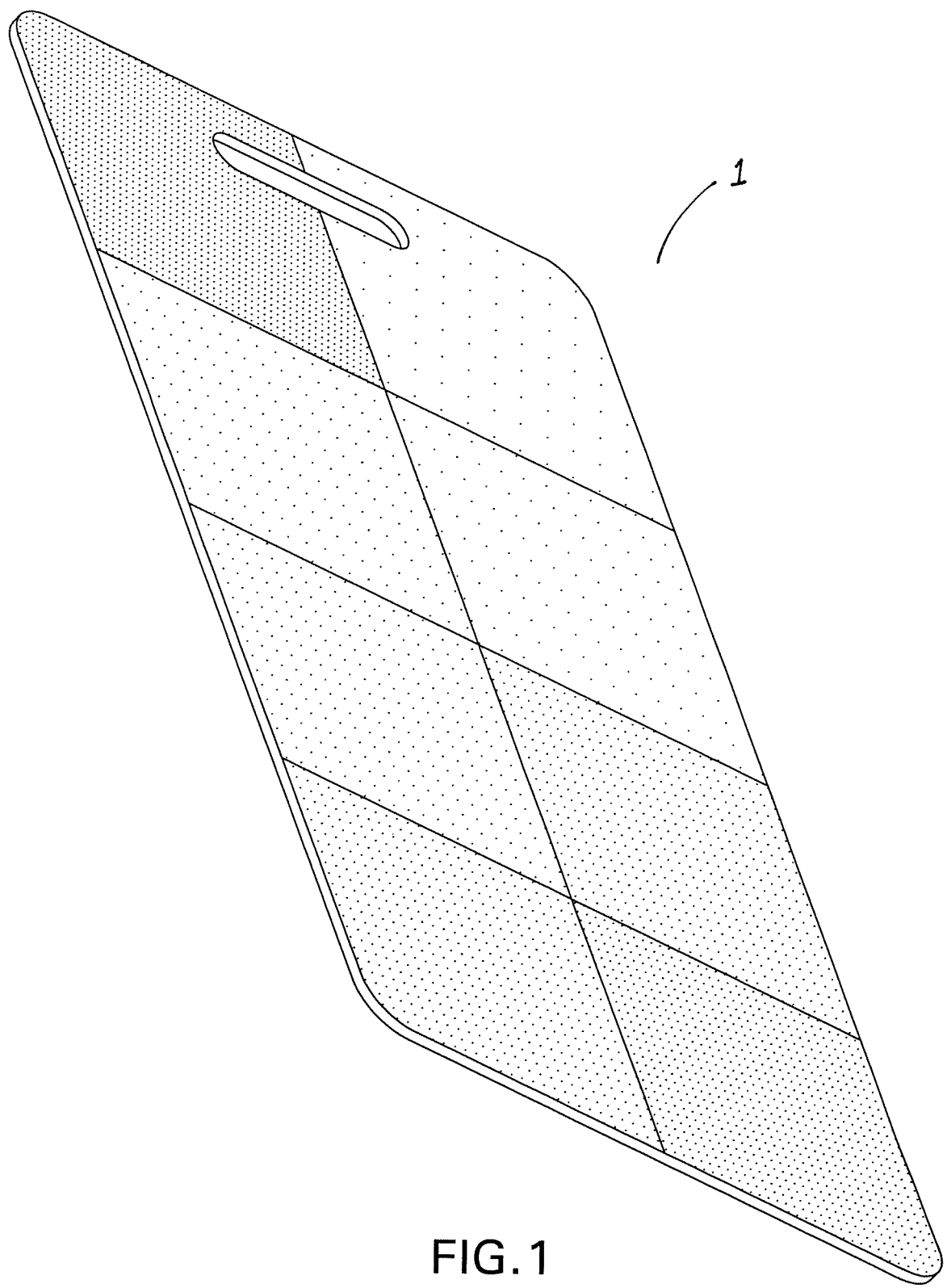
FIG. 1 is a perspective view of a scuba photography device 1 according to an embodiment of the invention.
Figure 2:
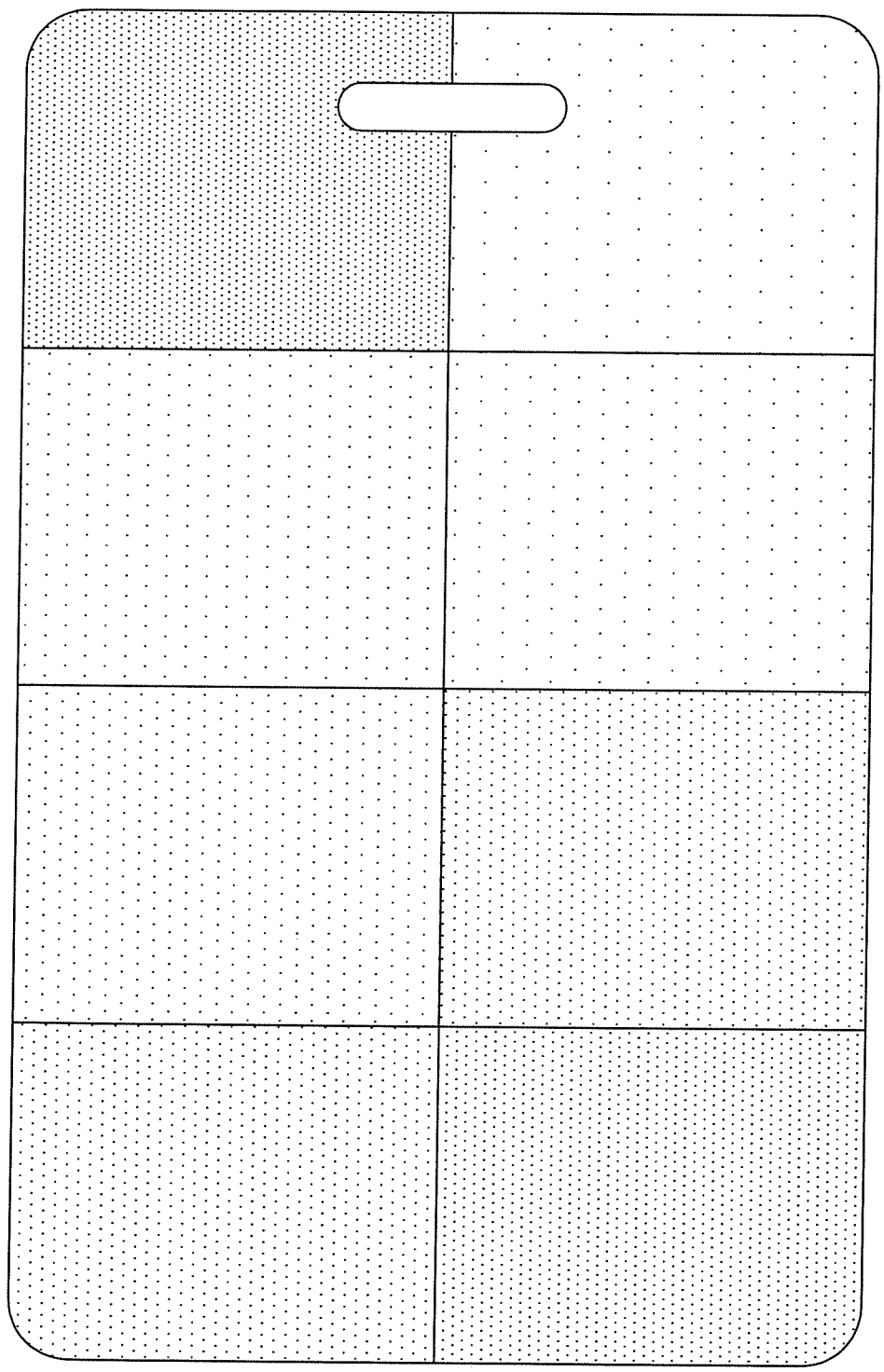
FIG. 2 is a front elevational view of device 1.
Figure 3:
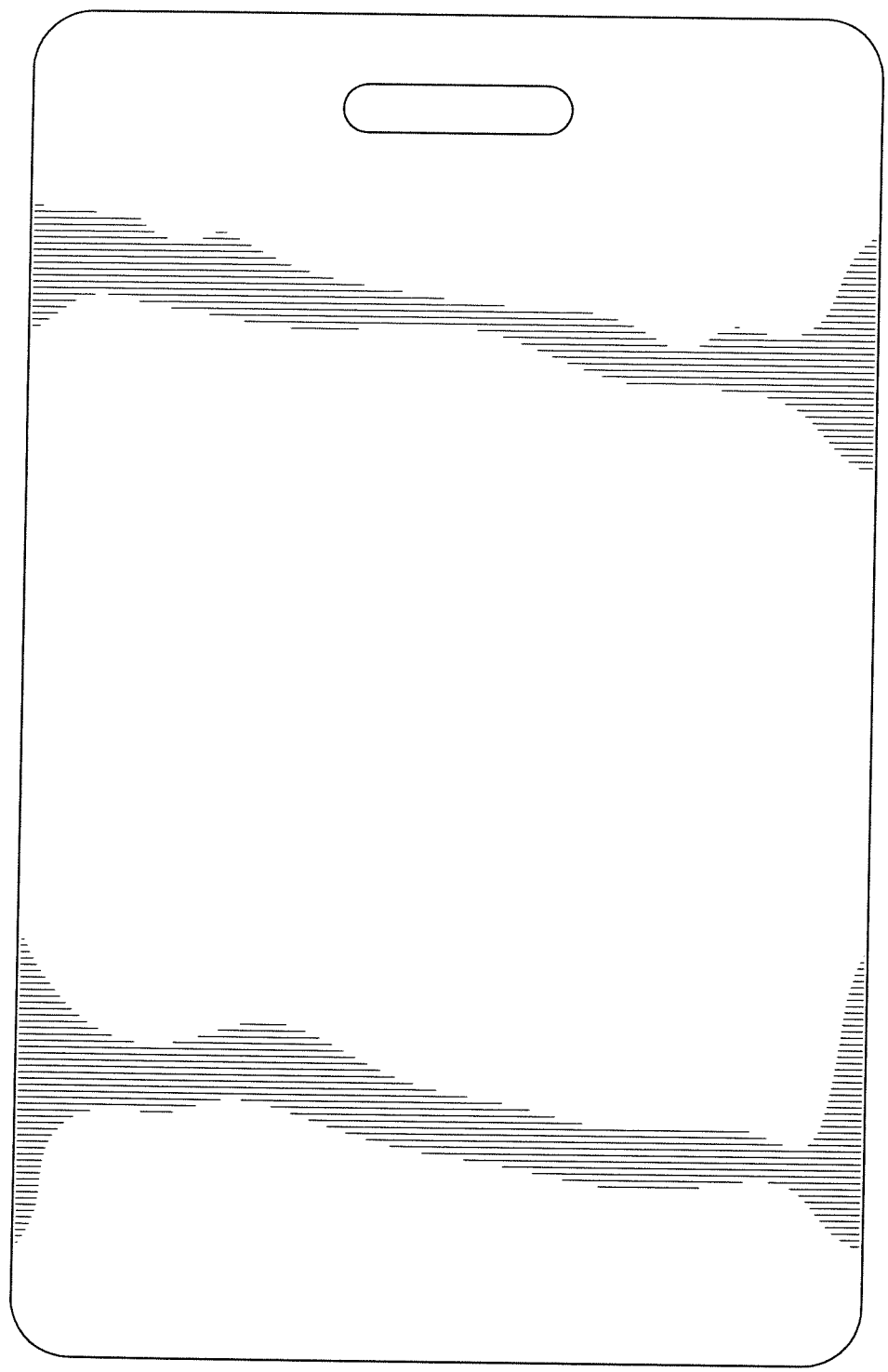
FIG. 3 is a rear elevational view of device 1.
Figure 4:
FIG. 4 is a left side elevational view of device 1.
Figure 5:
FIG. 5 is a right side elevational view of device 1.
Figure 6:
FIG. 6 is a top plan view of device 1.
Figure 7:
FIG. 7 is a bottom plan view of device 1.

The present inventor has invented underwater photography technology useable by a scuba diving photographer to take photographs, including at depths, without needing to use external lighting during the photographing. A preferred example is a business-card-sized plastic device 1 (FIG. 1), comprising respective color blocks of Panatone codes that correspond to "deletion" of water from the photo.

The following seven color blocks are considered essential to include: Grey Cool Gray 3 c; Red 1807C; Green 7740 C; Magenta 2061 C; Yellow 611 C; Orange 7555 C and Blue 8782 C. Most preferably, a White 663C block is included with the seven color blocks. In embodiments that lack a White 663C block, inclusion of a substitute is preferred to outright omission of a white or whitish block. An example of replacing the White 663C block is use of a solid black block.

In a preferred embodiment, inventive color correction systems used on underwater photos disuse average color values for water. Inventive color correction methods preferably comprise creating a known reference point for each set of photos, without performing any step in which average color values for water are used. The present inventor has found that his inventive systems in which a known reference point is created for each set of photos provide much higher accuracy compared to conventional auto correction using average color values for water, and also that a much larger amount of the photo can be corrected using his inventive systems compared to using conventional auto correction.

An inventive device 1 is not required to be business-card-sized in all embodiments. Preferably dimensions of device 1 should be big enough to facilitate manipulation of device 1 by a human hand underwater at depths; on the other end, extra surface area and extra volume preferably are avoided in making device 1.

A preferred example of a camera useable with inventive device 1 and in inventive systems and methods is a camera that shoots raw, such as, e.g., Sony RX 100 II, Sony RX 100 III. Sony RX 100 IV, Sony RX 100 V, Sony A7R, Sony A7R2. Sony A7R3, etc.

Examples of a photography application to use in inventive systems, are, e.g., Capture One Pro. Adobe Lightroom, Skylum Luminar, etc., most preferably. Capture One Pro.

The invention may be appreciated with reference to the following examples, without the invention being limited to the examples.

Example 1

The following set of Panatone color codes:
White 663C
Grey Cool Gray 3 c
Red 1807C
Green 7740 C
Magenta 2061 C
Yellow 611 C
Orange 7555 C
Blue 8782 C
was determined by the inventor to correspond to "deletion" of water from a photo taken underwater.

Example 1A

A prototype hard-plastic card, business-card-sized, was constructed. The set of Panatone coded color blocks of Example 1 were arranged with the white block at top left, going clockwise: a first section defined by Panatone color code White 663C; a second section defined by Panatone color code Grey Cool Gray 3 c; a third section defined by Panatone color code Red 1807C; a fourth section defined by Panatone Green 7740 C; a fifth section defined by Panatone Magenta 2061 C; a sixth section defined by Panatone Yellow 611 C a seventh section defined by Panatone Orange 7555 C. an eighth section defined by Panatone Blue 8782 C.

Example 1B

In the prototype of Example 1A, a hole was punched into the white-colored box, for easy attachment to scuba gear.

Example 2 (Morehouse City Photography)

On the same dive that a "Morehouse City" subject was photographed and yielded a Conventional Obscured-Blue photo, at same depth, the prototype of Example 1B was photographed, resulting in a high-quality Morehouse City image that has the water "deleted", and looks as if the picture was taken at the surface despite having been taken at 100 ft.

Example 2A (Reference Photo)

The same reference photo can be used on all photos of subjects taken in similar water/light conditions. Reuse of the reference photo is open-ended as to time; a new reference photo is only required if significant changes in light or water clarity occur.

Example 3

Card 1 is useable in combination with commercially available photography software such as Capture One Pro. The user makes initial adjustments to a First Photograph (including card 1) using the Capture One Pro photography software.

Example 3A

Optionally the initial adjustments according to Example 3 are saved, and applied to additional photos that do not have the card in them.

Example 4

In this example which is a preferred embodiment of the invention, the card must be taken on each dive, and when the photographer notices a change in water conditions, a reference photo of the card is taken. The photos should be taken in the RAW format for best results. After uploading the photos to a computer, the photographer selects the image with the card appearing in the image. After such selection, the first step is to adjust white balance off the 18% neutral grey block. Then, using the application's Hue, Saturation, and Luminosity tools, adjustment of each is performed until the card's colors match how they appear above water. Then, those adjustments are saved as a preset. The saved preset then can be applied to all the photos taken under similar lighting/water conditions. Slight adjustments will need to be made to white balance as that is the most variable factor.

Comparative Example 5 (Conventional)

When photograph application Capture One Pro is used in a conventional manner, WITHOUT inventive card 1, each photo takes about 20-30 minutes to correct.

Example 5

With an inventive system using inventive card 1 and photography application Capture One Pro, a day's worth of dive photos, ~400 photos, were completely edited and corrected in about two hours.

Example 6

In some embodiments the invention can be practiced without a dive photographer himself having possession of an inventive card while diving, such as if he obtains presets initially created by another (such as by the inventor) with a card. Such systems in which the diver obtains the presets rather than obtaining the physical card work for locations that have consistent dive conditions, as is the case for many dive locations. For example, the inventor has created presets for specific dive sites and depths around the area of Tofo Mozambique ("TofoM Presets"), that other photographers can use without taking the inventive card with them. The other photographers can get to the 75% correct level by obtaining the TofoM Presets, whereas if they carry and use an inventive card on their dive, they can get to 90% correct level.

Example 7

The following set of Panatone color codes:
Solid Black
Grey Cool Gray 3 c
Red 1807C
Green 7740 C
Magenta 2061 C
Yellow 611 C
Orange 7555 C
Blue 8782 C
is usable to "delete" water from a photo taken underwater.

Example 7A

The following set of Panatone color codes:
Grey Cool Gray 3 c
Red 1807C
Green 7740 C
Magenta 2061 C
Yellow 611 C
Orange 7555 C
Blue 8782 C
is usable to "delete" water from a photo taken underwater.

The descriptions of various embodiments of the present invention have been presented for purposes of illustrations, but are not intended to be exhaustive. Many modifications and variations will be apparent to those of ordinary skill in the art without departing from the scope and spirit of the described embodiments.

What I claim as my invention is:

1. An underwater photography device, comprising a set of colored sections comprising
   a first section defined by Panatone color code White 663C,
   a second section defined by Panatone color code Grey Cool Gray 3 c,
   a third section defined by Panatone color code Red 1807C;
   a fourth section defined by Panatone Green 7740 C;
   a fifth section defined by Panatone Magenta 2061 C;
   a sixth section defined by Panatone Yellow 611 C;
   a seventh section defined by Panatone Orange 7555 C;
   an eighth section defined by Panatone Blue 8782 C;
   the set of colored sections being disposed on a solid object;
   wherein the solid object is characterized by an exterior consisting of a non-paper material.

2. An underwater photography device, comprising a set of sections comprising
   a section defined by Panatone color code Grey Cool Gray 3 c,
   a section defined by Panatone color code Red 1807C;
   a section defined by Panatone Green 7740 C;
   a section defined by Panatone Magenta 2061 C;
   a section defined by Panatone Yellow 611 C;
   a section defined by Panatone Orange 7555 C;
   a section defined by Panatone Blue 8782 C;
   the set of colored sections being disposed on a solid object;
   wherein the solid object is characterized by an exterior consisting of a non-paper material.

3. The underwater photography device of claim 2, wherein the exterior consists of plastic.

4. The underwater photography device of claim 2, wherein the solid object is a card.

5. The underwater photography device of claim 2, consisting of plastic and colorants.

6. The underwater photography device of claim 5, wherein the solid object is a card having a length of about 3.5 inches, a width of about 2 inches, and a thickness in a range of about 0.01-0.25 inches.

7. The underwater photography device of claim 2, wherein the solid object is flat.

8. The underwater photography device of claim 4, further comprising a hole in the card, wherein the hole receives a diving clip clipped through the hole.

9. The underwater photography device of claim 4, wherein the cross-sectional surface area of the card is no more than about 7 square inches.

10. The underwater photography device of claim 2, further comprising a section defined by Panatone color code White 663C.

11. An underwater photography method, comprising:
receiving, into a computer, an image of a card comprising a set of color blocks, the card being characterized by a non-paper exterior, wherein the image of the card was photographed by a scuba diver underwater,
receiving, into the computer, an image of a subject, wherein the image of the subject was photographed by the scuba diver underwater at a same depth as the image photographed of the card;
in the image of the subject, deleting the water.

12. The method of claim 11, further comprising photographing the card and photographing the subject at a depth of about 100 feet.

13. The method of claim 11, wherein no external lighting was used during underwater photography.

14. The method of claim 11, wherein the card used in the method comprises a set of sections comprising:
a section defined by Panatone color code Grey Cool Gray 3 c,
a section defined by Panatone color code Red 1807C;
a section defined by Panatone Green 7740 C;
a section defined by Panatone Magenta 2061 C;
a section defined by Panatone Yellow 611 C;
a section defined by Panatone Orange 7555 C;
a section defined by Panatone Blue 8782 C;
the set of colored sections being disposed on a solid object; wherein the solid object is characterized by an exterior consisting of a non-paper material.

15. The method of claim 14, wherein the card used in the method further comprises a section defined by Panatone color code White 663C.

16. The method of claim 11, wherein the card used in the method has a length of about 3.5 inches, a width of about 2 inches, and a thickness in a range of about 0.01-0.25 inches.

17. The method of claim 11, further comprising clipping a diving clip through a hole in the card.

18. The method of claim 11, wherein the card used in the method has cross-sectional surface area of no more than about 7 square inches.

* * * * *